United States Patent [19]

Michon et al.

[11] 4,119,928

[45] Oct. 10, 1978

[54] LASER HEAD AND APPLICATION THEREOF TO A LASER GENERATOR DEVICE

[75] Inventors: Maurice Michon, Draveil; Bernard Sturel, Saint Cheron, both of France

[73] Assignee: Compagnie General d'Electrocite S.A., Paris, France

[21] Appl. No.: 766,816

[22] Filed: Feb. 8, 1977

[30] Foreign Application Priority Data

Feb. 17, 1976 [FR] France .............................. 76 04313

[51] Int. Cl.² .................................................. H01S 3/093
[52] U.S. Cl. ............................ 331/94.5 P; 331/94.5 F; 330/4.3
[58] Field of Search ...................... 331/94.5 C, 94.5 F, 331/94.5 P, 94.5 D; 330/4.3

[56] References Cited

U.S. PATENT DOCUMENTS

| 3,622,907 | 11/1971 | Tomlinson et al. | 331/94.5 C |
| 3,983,511 | 9/1976 | Fricke | 331/94.5 E |
| 3,999,145 | 12/1976 | Gilman et al. | 331/94.5 E |

*Primary Examiner*—William L. Sikes
*Attorney, Agent, or Firm*—Sughrue, Rothwell, Mion, Zinn and Macpeak

[57] ABSTRACT

The invention relates to a laser head and the application thereof to a laser generator device. The laser head comprises in particular a neodymium-doped glass rod, a light excitation source and laser rubies excited by this source, the beams emitted by the laser rubies being returned towards a zone of the glass rod which is insufficiently excited by the light source.

11 Claims, 7 Drawing Figures

LASER HEAD AND APPLICATION THEREOF TO A LASER GENERATOR DEVICE

FIELD OF THE INVENTION

The present invention relates to laser heads and to laser generator devices.

BACKGROUND OF THE INVENTION

In the following text laser head means a device comprising essentially an active material and means for exciting this active material. A laser head amplifies when a laser beam passes through its active material. Further, a laser generator may be obtained by adding a resonant optical cavity to such a head. Lastly, when a laser head or a succession of laser heads is disposed at the output of a laser generator, a laser generator device is obtained.

A laser amplifier head is known in which the active material is constituted by a neodymium-doped glass rod and the excitation means comprise light discharge tubes disposed around the side surface of the rod. When a high energy laser beam passes through the active material, the cross-section of the rod must be large. But with a large rod it is observed that the light energy generated by the discharge in the tubes provokes a non-homogeneous illumination of the rod. An axial zone of the rod is less illuminated and the population inversion therein is smaller. This results in a deformation of the cross-section of intensity of the amplified laser beam and an appreciable reduction of the power of this beam.

To remedy these drawbacks, laser head disc structures have been produced in which the light excitation is directed mainly onto the surfaces of the discs, but these structures have a low excitation efficiency and are also technically very difficult to produce. "Plate" structures have also been proposed in which the active material is excited by discharge tubes disposed along one surface of the plate. In some cases, plate structures make it possible to improve the homogeneity of the illumination of the active material, but have the disadvantage of being difficult to produce because generally it is necessary to treat the surface of the plate which is illuminated by the discharge tubes, in order to improve the penetration of the light radiation in the plate and the reflection of the laser beam on this surface; this treatment withstands poorly the power of the radiation of the discharge tubes.

The present invention provides means for increasing the excitation of a laser head and in preferred embodiments it is used to mitigate the disadvantages of known laser heads referred to above and to provide new high-power laser head structures in which the active material is excited more homogeneously.

SUMMARY OF THE INVENTION

The present invention provides a laser head for amplifying a laser beam of a predetermided wavelength. The head comprises a laser amplifier block doped with an active material suitable for amplifying laser light of the predetermined wavelength. A light source is disposed to illuminate the amplifier block in order to pump the amplifier block by exciting the active material. A generator means is disposed to be illuminated by some of the light emitted by the light source and to generate a pumping laser beam in response thereto at a wavelength capable of exciting the active material or the amplifier block. Means are provided for directing said pumping laser beam to increase the excitation of a portion of the amplifier block.

A particularly advantageous combination is an active material of neodymium for amplifying at a predetermined wavelength of 1.06 microns in conjunction with a ruby laser generator means providing a pumping laser beam of 0.6943 microns which excites the $Nd^{3+}$ line of the niodymium spectrum.

The present invention also provides a laser generator device comprising a generator for a laser beam at the predetermined wavelength looking into the laser head of the invention.

Embodiments of the invention are described hereinbelow by way of a non-limiting illustration, with reference to the accompanying drawing.

DESCRIPTION OF THE PREFERRED EMBODIMENTS

Figure 1A:
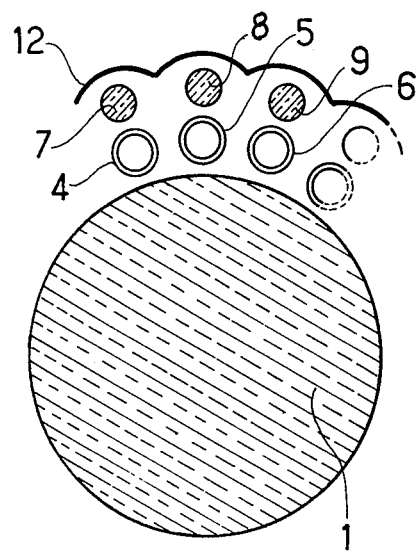
FIGS. 1a and 1b show schematically, respectively a transversal cross-section and a longitudinal cross-section of a laser head embodying the invention.
Figure 1B:
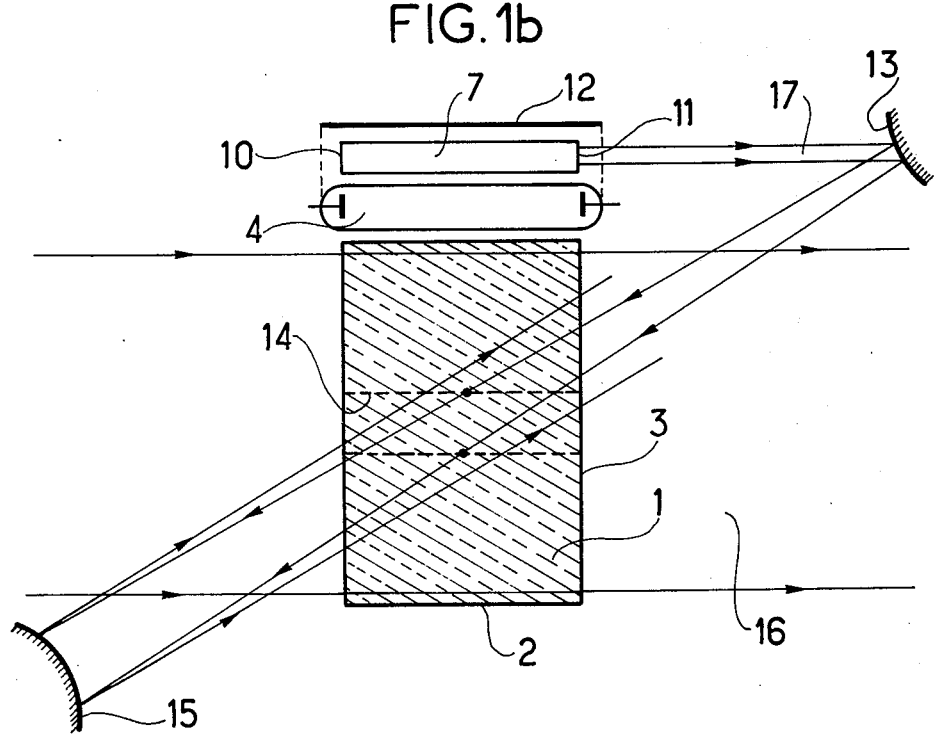

FIGS. 1a and 1b show a neodymium-doped glass rod 1. The length 2 of the rod 1 is preferably less than its width 3. The rod 2 can have a cylindrical shape, for example, and in that case the width is the diameter of the rod 1.

Light discharge tubes 4, 5, 6 are disposed side by side round the cylindrical surface of the rod 1 for example in a direction parallel to the axis of the rod 1. The electrodes of these tubes can be connected together at the terminals of an electrical supply source.

Ruby rods 7, 8, 9, which are also oriented parallel to the axis of the rod 1, are disposed side by side round the ring of discharge tubes. Each ruby rod is placed inside a resonant optical cavity centred on the axis thereof. This cavity can advantageously be constituted by multi-dielectric layers deposited on the plane end surfaces 10 and 11 of these rods.

As shown in FIG. 1a, the number of ruby rods can be equal to the number of tubes, each ruby rod being associated with a tube disposed in a plane passing through the axes of the rod 1 and of the ruby rod.

A reflector 12 can also be disposed round the row of rods to return outwardly directed radial radiation from the discharge tubes 4, 5, 6 which has passed through the ruby rods 7, 8, 9 and has not illuminated the glass rod 1.

Reflectors such as 13 are placed on the axis of the resonant optical cavities to return the axial radiation emitted by these cavities towards an axial zone 14 of the glass rod 1.

Reflectors such as 15 can also be disposed on the path of the radiation returned by the reflector 13 and having passed through the axial zone 14 of rod 1 in order to reflect this radiation on itself again so as to make it pass through the axial zone 14 once more.

The device shown in FIGS. 1a and 1b operates as follows.

The electrodes of the discharge tubes such as 4, 5, 6 are connected to the terminals of the electrical supply source to cause a light discharge, some of which light directly excites the glass rod 1. Subsequently a laser beam 16 generated at a wavelength of 1.06 microns by a laser generator passes along the axis of the excited rod and is thereby amplified.

The beam 16 is a high-power beam after amplification and that is why a glass rod 1 having a large cross-section and a relatively short length has been chosen, this disposition enabling breakage of the rod and the appearance of non-linear phenomena to be avoided.

But subsequent to the adoption of this disposition the illumination of the rod 1 by the light of the discharge tubes is not homogeneous and a portion of the rod 1 constituted by the axial zone 14 is less illuminated than the peripheral portion which surrounds it.

The part of the light energy of the discharge tubes which does not illuminate the rod 1 is received by the ruby rods such as 7, 8, 9.

This light energy excites the rubies and the unabsorbed part of this energy is returned towards the ruby rods by the mirror 12.

A laser radiation results therefrom having a wavelength of 0.6943 microns constituted in particular by the beam 17 emerging from the cavity 10–11. After reflection at the mirror 13, the beam 17 passes through the axial zone 14 and causes additional excitation of the neodymium-doped glass in this zone 14. Indeed, it is known that radiation on having a wavelength of 0.6943 microns is absorbed by the "edge" of one of the absorption lines of the neodymium $Nd^{3+}$.

This additional excitation therefore makes it possible to compensate the reduction of illumination in the axial zone 14 of the rod 1.

As a single pass through the axial zone 14 beam 17 sent back by the mirror 13 generally does not exhaust the excitation energy of this beam, it is often useful to return the beam via the mirror 15, as shown in FIGS. 1a and 1b, in order to make it pass through this axial zone once more.

It will be understood that it is possible to obtain a homogeneous population inversion by dosing the additional energy as a function of the energy supplied directly by the discharge tubes and thus to increase greatly the homogeneity and the output power of the beam 16 for a given cross-section of the rod 1.

Experience shows that generally in known heads the part of the light energy of the discharge tubes which does not illuminate the glass rod directly contributes to the excitation of the rod only to a small extent even if it is sent back towards the rod by a reflector. The disposition shown in FIGS. 1a and 1b has the advantage of using this part of the energy efficiently.

Taking for example a neodymium-doped glass rod having a diameter of 11 centimeters and a length of 8 centimeter, 25 discharge tubes having a diameter of 1 centimeter and 25 ruby rods having a diameter of 0.5 centimeter can be disposed round the lateral surface of the rod, as shown in FIG. 1a. The total light energy delivered by the tubes being 20 kilojoules, the laser energy at a wavelength of 1.06 microns caused by the radiation of the tubes is in the order of 230 joules, this energy being distributed transversally in the glass rod according to a substantially parabolic law. Each ruby rod emits an energy of 4 joules at the wavelength of 0.6943 microns. The total energy of the radiation emitted by the rubies and returned towards the axial zone of the rod is then 100 joules, the additional excitation resulting therefrom in the glass rod being about 70 joules. Due to this additional excitation the energy emerging from the beam 16 is therefore increased by nearly a third and the distribution of the energy available in the glass rod is substantially homogeneous. In the example given hereinabove, the effective absorption cross-section is optimum and ensures simultaneously a great penetration depth and a total absorption in the neodymium-doped glass.

Figure 2:
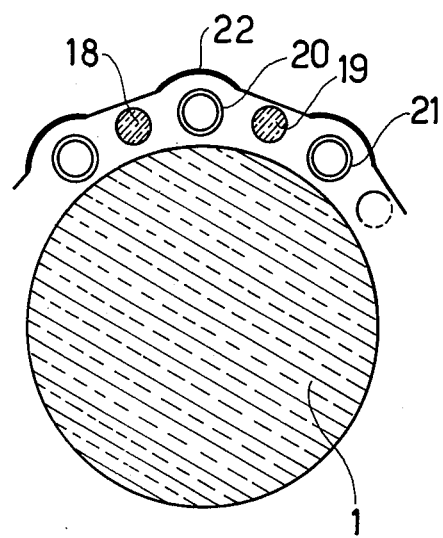
FIG. 2 is a transversal cross-section of a variant of the laser head of FIGS. 1a and 1b.

FIG. 2 shows a variant of the device shown in FIGS. 1a and 1b. In this variant laser rubies and discharge tubes 20 and 21 are disposed alternately round the cylindrical surface of the glass rod 1 so as to form a single ring. Each laser ruby such as 19 is disposed between two tubes 20 and 21 so as to be excited mainly by the tangential radiation of the tubes, the radial radiation of these tubes which does not illuminate the rod 1 being reflected by a reflector 22. Of course the laser radiation of the rubies is returned by reflectors not shown towards an axial zone of the glass rod 1, as shown in FIG. 1b.

Figure 3A:
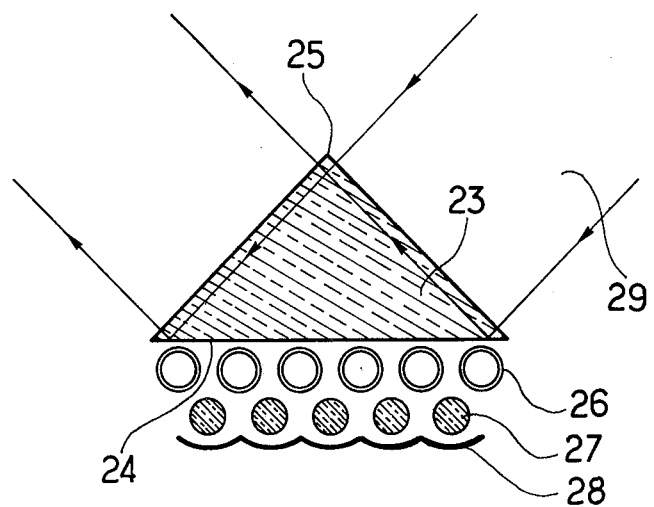
FIGS. 3a and 3b are respectively a transversal cross-section and a longitudinal cross-section of another embodiment of a laser head of the invention.
Figure 3B:
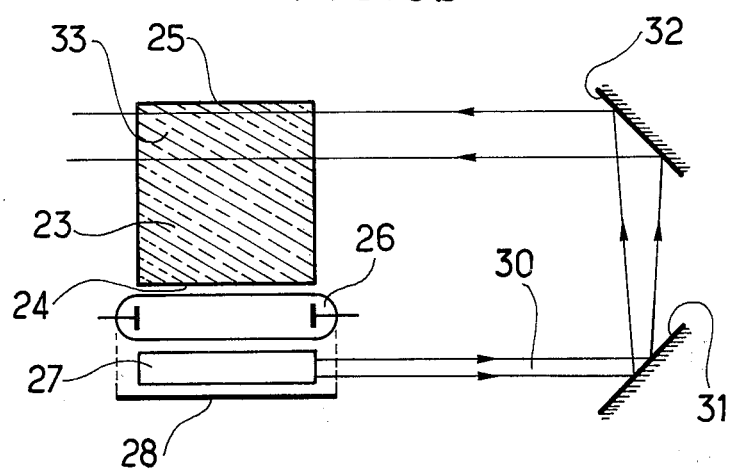

FIGS. 3a and 3b show a laser head comprising a neodymium-doped glass active material in the shape of a prism 23 with a triangular cross-section. Discharge tubes such as 26 are disposed side by side along the surface 24 of the prism opposite and parallel to its apex 25 so as to form a row facing the surface 24. Ruby rods such as 27 placed in the resonant cavities are also disposed parallel to the face 24 and to the apex 25 in the proximity of the tubes 26 so as to form another row which is further away from the surface 24 than the row of tubes. A reflector 28 is disposed to return towards the surface 24 the part of the radial radiation of the tubes 26 which does not illuminate the prism 23.

The prism 23 is traversed twice by a beam 29 having a wavelength of 1.06 microns which is reflected on the surface 24 of the prism. When a light discharge is triggered in the tubes 26, the prism 23 is illuminated by the direct radiation coming from the tubes, causing the excitation of the active material, the prism 23 being less illuminated in a zone 33 close to the apex 25. Each ruby laser cavity produces a laser beam 30 which, is returned towards the less illuminated zone 33 of the prism, after reflection by reflectors 31 and 32.

In the disposition shown in FIGS. 3a and 3b, the beam 29 undergoes total reflection on the surface 24, thereby avoiding the necessity of depositing multidielectric reflecting layers having a wavelength of 1.06 microns on this surface, these layers being the fragile element of "plate" structures.

Figure 4:
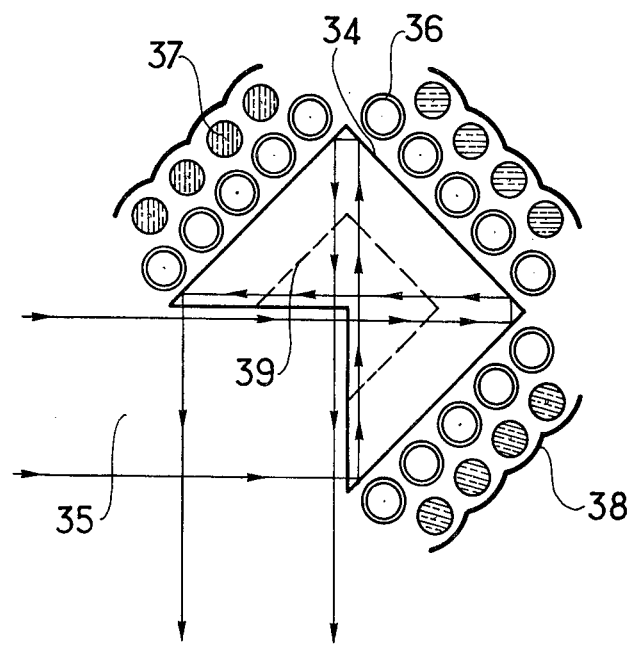
FIG. 4 is a transversal cross-section of a variant of the laser head illustrated in FIGS. 3a and 3b.

FIG. 4 shows that it is possible to produce an embodiment analogous to the one in FIG. 3a but in which the base of the prism is a polygon having more than three sides and the discharge tubes are disposed on several surfaces of the prism. In the embodiment shown the polygon which constitutes the cross-section of the prism 34 comprises a convex part made up by 3 sides and a concave part made up by 2 sides. The light beam 35 having a wavelength of 1.06 microns enters the prism 34 through one of the inner surfaces of the prism 34 i.e. in the concave part) and emerges therefrom by the other inner surface after having been reflected on the outer surfaces of the prism i.e. around the convex part).

Discharge tubes such as 36 and laser rubies such as 37 are disposed all along the three outer surfaces of the prism 34, reflectors such as 38 analogous to the reflector 28 or FIG. 3a being disposed so as to return the radiation of the tubes towards the surfaces of the prism.

Of course, the laser beams emerging from the laser rubies 37 are directed after reflection onto reflectors towards a central zone 39 of the prism 34 in order to increase the population inversion in this zone which is insufficiently illuminated by the radiation of the discharge tubes 36.

Figure 5:
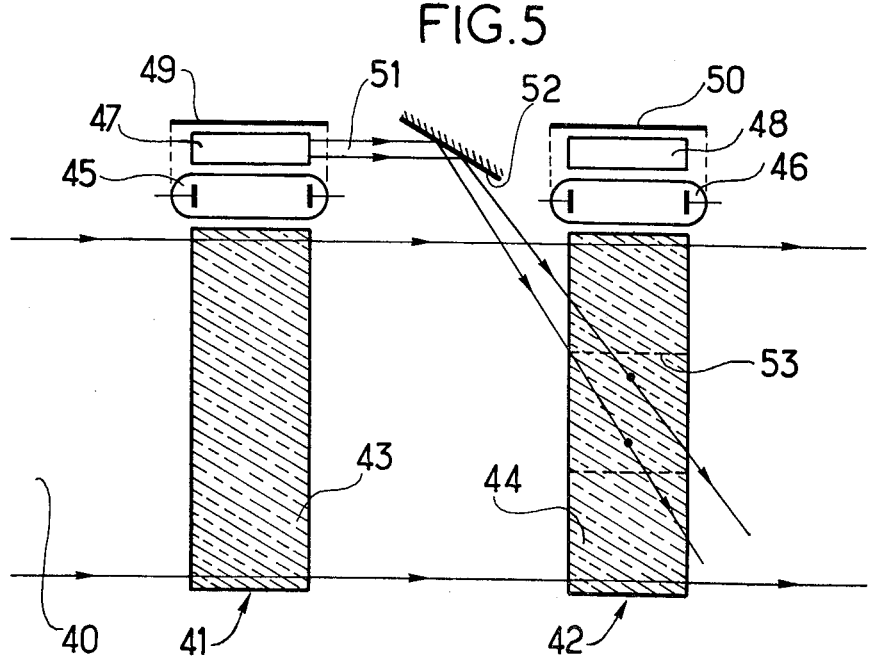
FIG. 5 shows a laser generator device embodying the invention.

The device shown in FIG. 5 illustrates schematically an application of the laser head embodying the invention to a laser generator device. A laser beam 40 having a wavelength of 1.06 microns coming from a laser generator which is not shown passes successively through several amplifiers two of which 41 and 42 are shown in the figure.

Each amplifier comprises a neodymium-doped glass rod respectively 43 and 44, a ring of discharge tubes 45 and 46, a ring of laser rubies 47 and 48 and a reflector 49, 50 surrounding the tubes and the rubies.

But beams such as 51 emitted by the rubies 47 of one amplifier 41 are reflected by mirrors 52 towards the axial zone 53 of the glass rod 44 of the next amplifier 42, this zone 53 being insufficiently excited by the radiation of the discharge tubes 46.

In the case of a laser generator device, the embodiment shown in FIG. 5 can lead to technical productions which are more simple than those resulting immediately from the embodiment shown in FIGS. 1a and 1b.

The laser head and the laser generator device embodying the invention can be applied to the study of dense and hot plasmas created by concentration of the output energy of laser generator devices.

What is claimed is:

1. In a laser head comprising:
a neodymium doped glass active material; and a light source disposed so that a part of the light emitted by this source illuminates said active material and thereby excites it in order to make it capable of amplifying a laser beam having a wavelength of 1.06 microns passing therethrough, there being a position, of the active material which is less well illuminated by the light source than the rest of the active material; the improvement comprising a plurality of ruby crystals, each of said ruby crystals being disposed inside a resonant optical cavity, said crystals being situated close to said light source to receive at least some of that part of said light which does not illuminate said active material, so as to produce a laser radiation along the axis of these cavities; and means for directing said laser radiation on said less well illuminated portion of said active material.

2. A laser head according to claim 1, wherein; said active material is cylindrical, said laser beam passes therethrough along the axis of the cylinder, said crystals comprise rods 7, 8, 9, the axes of these rods and of the resonant optical cavities being substantially parallel to the axis of said active material, said rods being placed side by side round the cylindrical surface of the active material, said light source comprising a plurality of discharge tubes disposed side by side round the cylindrical surface of the active material, said less illuminated portion being an axial zone of the active material and wherein said means for directing said laser radiation towards the less illuminated portion of this material comprises reflectors disposed so as to return this radiation into said axial zone.

3. A laser head according to claim 2, further comprising means for returning to said axial zone the laser radiation which has already once traversed this zone.

4. A laser head according to claim 2, wherein the transversal dimension of said active material is greater than the length of this material.

5. A laser head according to claim 2, wherein the number of said discharge tubes is equal to the number of said rods.

6. A laser head according to claim 2, wherein said resonant optical cavities are constituted by multi-dielectric layers deposited on the plane surfaces of said rods.

7. A laser head according to claim 5, wherein each of said tubes is situated in a plane passing along the axis of said active material and containing one of said rods between the cylindrical surface of the active material and the rod and wherein the head also comprises a reflector disposed so as to return inwardly the outwardly propagating radiation of the discharge tubes.

8. A laser head according to claim 5, wherein each of said rods is disposed between two of said tubes, said rods and said tubes being thus placed alternately side by side round the cylindrical surface of said active material and wherein the head also comprises a reflector disposed so as to return inwardly the outwardly propagation radiation of said discharge tubes.

9. A laser head according to claim 2, wherein said active material is a prism, said light beam passing through the prism and being reflected inwardly on at least one of the lateral faces of the prism, said ruby crystals being rods disposed close to the reflecting lateral surface, said axes of said rods and of said cavities being substantially parallel to the generatrices of said prism and to the reflecting lateral surface, said light source comprising a plurality of discharge tubes whose axes are substantially parallel to the generatrices of said prism and to the reflecting lateral surface, and the discharge tubes being placed between said rods and the reflecting lateral surface.

10. A laser head according to claim 9, further comprising a reflector disposed close to said rods so as to return towards said reflecting lateral surface that part of the axial light radiation coming from said discharge tubes which does not illuminate said active material.

11. A laser generator device comprising: a laser beam generator having a wavelength of 1.06 microns; and at least a first amplifier and a second amplifier, each composed by a neodymium-doped glass active material disposed on the path of said laser beam and by a light source disposed so that a part of the light emitted by the source illuminates directly the active material to amplify the laser beam, one portion of the active material being less illuminated than the other; said first amplifier also comprising ruby crystals each disposed inside a resonant optical cavity, said crystals being situated close to the light source of this first amplifier to receive said other part of the light not illuminating directly the active material of this first amplifier so as to produce a laser radiation along the axis of these cavities and said device further comprising means for directing said ruby laser radiation on the less illuminated portion of the active material of said second amplifier.

* * * * *